April 8, 1969
J. S. SCOGGIN
3,437,646
REACTION PROCESS
Filed Oct. 21, 1964
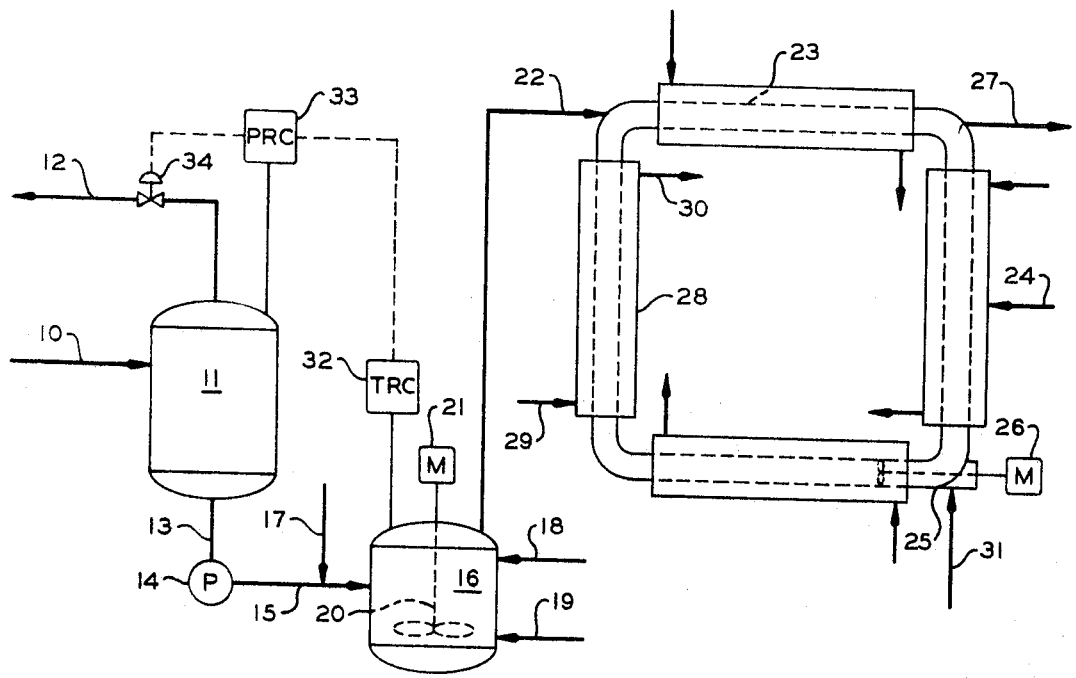
INVENTOR.
J.S. SCOGGIN
BY Young & Quigg
ATTORNEYS United States Patent Office
3,437,646
Patented Apr. 8, 1969

3,437,646
REACTION PROCESS
Jack S. Scoggin, Bartlesville, Okla., assignor to Phillips Petroleum Company, a corporation of Delaware
Filed Oct. 21, 1964, Ser. No. 405,340
Int. Cl. C08f 15/04, 19/02, 3/08
U.S. Cl. 260—88.2           5 Claims

ABSTRACT OF THE DISCLOSURE

In the production of polymers from at least two olefin feedstocks, one of said feedstocks is first cooled by autorefrigeration and then passed to an adiabatic reaction zone wherein the other feedstock is polymerized. Thereafter, the resulting reaction mass is passed to a second polymerization zone wherein the polymerization goes to completion.

---

This invention relates to a process and apparatus for producing copolymers. In one of its aspects this invention relates to a process for polymerizing a mixture of olefins. In another aspect this invention relates to an improved polymerization system for the production of copolymers.

In the production of copolymers and particularly those exhibiting tacky characteristics, fouling of the polymerization reactor frequently occurs which in turn often causes shutdown of the entire system. This fouling is generally the result of buildup on the reactor wall of the tacky polymer. As the buildup of polymer on the reactor walls continues, there is a corresponding increasing difficulty in achieving the transfer of undesired heat from the reactor. The combination then of excess heat in the reactor due to the poor heat transfer through the reactor walls coupled with the continuous buildup of polymer on the reactor system results ultimately in an uncontrollable and inoperable system.

Accordingly, it is an object of the present invention to provide an improved method for the copolymerization of olefins. Another object of the invention is to provide a novel polymerization system which avoids the problems of reactor fouling and shutdown.

Other objects, aspects and the several advantages of the invention will be readily apparent to those skilled in the art from the description, the appended claims, and the drawing, which is a diagrammatic representation of the inventive process and apparatus.

Broadly, in accordance with the present invention I have discovered that 1-olefin copolymers such as ethylene-propylene copolymers can be prepared free from the problem of reactor fouling by carrying out a primary polymerization of the monomers employed in an adiabatic reactor wherein the temperature of the primary reactor is controlled by the temperature of one of the liquid monomers fed to the reactor and thereafter introducing the initial reaction mass into a secondary reaction zone wherein the remainder of the polymerization of the monomers to the desired polymers is carried out.

More specifically, I have discovered that by carrying out the initial polymerization stage in an adiabatic reactor there is avoided the heat transfer problems heretofore experienced due to the fouling of the reactor by buildup of polymer on the reactor walls. Since the adiabatic reactor does not require the transfer of heat from the reactor, the resulting tacky polymer produced therein does not present a heat transfer problem. The resulting tacky polymer converts rapidly to a non-tacky polymer in a secondary reactor so that fouling in the secondary reactor system is likewise avoided.

As a more specific embodiment of the invention, I have discovered that ethylene propylene copolymers are readily produced free from the problem heretofore experienced of reactor fouling due to buildup of polymer on the reactor walls by carrying out a primary polymerization of the ethylene and propylene in a liquid-full adiabatic reactor wherein the temperature is controlled by the amount of chilled propylene added thereto, and thereafter passing the reaction mass after substantially complete conversion of the ethylene feed in the primary reactor to a secondary reaction zone wherein the polymerization of the remaining monomeric materials present is completed.

As shown in the accompanying drawing, liquid propylene is introduced by means of line 10 to tank 11 wherein a portion of same is flashed and removed through line 12 to cool the remaining liquid. Propylene vapor is removed via line 12 to a compressor and condenser, not shown, and then recycled to line 10. The resulting cold propylene is removed from tank 11 by means of line 13 and pump 14 and passed to primary reactor 16 by means of line 15.

Since reactor 16 is an adiabatic type reactor, the heat evolved during the course of the primary polymerization reaction is dissipated due to the differential in temperature between the reaction mass and the cold propylene from line 15.

Suitable polymerization catalyst is introduced to reactor 16 by means of line 17. Line 18 serves to introduce hydrogen to the reactor 16 and ethylene is introduced by means of line 19. Reactor 16 is provided with agitator 20 driven by motor 21. Heat of reaction in reactor 16 is removed by the temperature rise between reactor feed and reaction mixture. The reactor effluent is removed from reactor 16 by means of line 22 which communicates with loop reactor 23. Additional hydrogen is added by means of line 24 to the liquid-full system. A stirring means 25, driven by motor 26, is provided within the loop reactor to assure continuous circulation of the reaction mass therein. Line 27 is provided to remove the ultimately desired polymer product from reactor 23 which can then be subsequently handled by any conventional manner. While the drawing illustrates the use of a loop type secondary reactor, other conventional polymerization apparatus can be employed. Heat of reaction is removed by jackets 28 which are provided with inlet 29 and outlet 30 to assure circulation of a heat exchange medium therein. Additional catalyst, if required, can be added to reactor 23 by means of conduit 31. Reactor 16 can also be a loop type reactor as well as the pot type reactor shown or other adiabatic reactor. The cooling of the liquid propylene by flashing a portion thereof is regulated responsive to the temperature in reactor 16. Thus temperature recorder controller 32, set to maintain a predetermined temperature, senses the temperature in the reactor and provides a signal which adjusts pressure recorder controller 33 which in turn actuates motor valve 34, flashing a portion of the liquid and thereby cooling the remaining liquid propylene to the level required to maintain the temperature level in the primary reactor 16, as previously explained, at the desired level.

While not intending to limit the invention to any particular theory of operation, it is thought that the present invention, for example when copolymerizing ethylene and propylene, proceeds by the conversion of a substantial portion of the ethylene monomer in the primary or adiabatic reaction zone and the resulting tack polymer reaction mass is subjected to additional polymerization with the remainder of the propylene in the secondary reaction zone wherein the tacky polymer is rapidly converted to a non-tacky polymer, which presents no problem of reactor fouling.

Since a wire variety of catalyst systems can be employed in the polymerization, it is not intended to limit the invention to any particular catalyst system. Catalyst systems suitable for use in the polymerization are those which are capable of polymerizing a mono-1-olefin in a mass polymerization system and under conditions such that solid polymer in particle form is produced. Catalyst systems suitable for use can broadly be defined as comprising an organometal compound and a metal salt. A particularly suitable catalyst is one which comprises (a) a compound having the formula $R_nMX_m$, wherein R is an alkyl, cycloalkyl, or aryl radical or combinations of these radicals, such as alkaryl, aralkyl and alkylcycloalkyl, X is hydrogen or a halogen, including chlorine, bromine, iodine and fluorine, M is aluminum, gallium, indium or thallium, $n$ is from 1 to 3, inclusive, $m$ is from 0 to 2, inclusive, and the sum of $m$ and $n$ is equal to the valence of the metal M, and (b) a halide of a metal of Group IV–B, V–B, VI–B or VIII. The hydrocarbon radicals which can be substituted for R in the aforementioned formula include radicals having up to about 20 carbon atoms each. Radicals having 10 carbon atoms or less are preferred since the resulting catalyst composition has a greater activity for initiating the polymerization.

Examples of compounds corresponding to the formula $R_nMX_m$ which can be employed include trimethylaluminum,
triethylaluminum,
triisobutylaluminum,
tri-n-butylaluminum,
tri-n-pentylaluminum,
triisooctylaluminum,
tri-n-dodecylaluminum,
triphenylaluminum,
triethylgallium,
triphenylgallium,
tricyclohexylgallium,
tri-n-butylindium,
triethylthallium,
diethylaluminum hydride,
$CH_3AlCl_2$,
$(CH_3)_2AlCl$,
$C_2H_5AlCl_2$,
$(C_2H_5)_2AlCl$,
$(C_4H_9)_2AlBr$,
$C_8H_{17}AlI_2$,
$(C_3H_7)_2GaF$,
$(C_6H_{11})_2GaCl$ (cyclohexane derivative),
$(C_6H_5)GaBr_2$ (benzene derivative),
$C_{20}H_{41}GaBr_2$,
$(C_{14}H_{29})_2GaF$,
$(C_6H_5)_2InCl$ (benzene derivative),
$C_8H_{17}InF_2$,
$(C_6H_{11})InBr_2$ (cyclohexane derivative),
3-methylcyclohexylaluminum dichloride,
2-cyclohexylethylgallium dichloride,
p-tolylberyllium iodide,
di-(3-phenyl-1-methylpropyl)indium fluoride,
2-(3-isopropylcyclohexyl)ethylthallium dibromide, and the like. Mixture of these material, such as a mixture of diethylaluminum chloride and ethylaluminum dichloride, etc., can also be employed.

The metal halide component of the catalyst system is preferably a halide of a Group IV–A metal, i.e., titanium, zirconium, hafnium and germanium. The trichlorides, trifluorides, tribromides, and triiodides, as well as the tetrachloride, tetrafluorides, tetrabromides and tetraiodides of the Group IV–A metals can be used in the catalyst system, either individually or as a mixtures of two or more of the metal halides. It is usually preferred to employ a trichloride, such as titanium trichloride, in the polymerization. However, it is to be understood that halides of metals of the other groups specified above, such as vanadium, molybdenum, tungsten, cobalt and iron can also be employed in the catalyst system.

The preferred catalyst system employed in the polymerization comprises a dialkylaluminum chloride, such as diethylaluminum chloride, and titanium trichloride, the latter compound preferably being prepared by reduction of titanium tetrachloride in the presence of aluminum. The reduction product is preferably a complex having the approximate formula $3TiCl_3 \cdot AlCl_3$. The reduction reaction is usually carried out at an elevated temperature, for example at a temperature in the range of 360° to 600° F., preferably from 375° to 450° F.

The amount of catalyst employed in the polymerization can vary over a rather wide range and will depend at least to a certain degree upon the particular catalyst system utilized. However, the determination of the actual amount of the catalyst employed in any particular polymerization is well within the skill of the art. In general, the mol ratio of the organometal compound to the metal salt falls within the range of 0.02 to 50 mols/mol. When employing the preferred catalyst system, the mol ratio of the dialkylaluminum halide to the titanium trichloride complex usually ranges from 1.0:0.02 to 1.0:50.0, preferably 1.0:0.1 to 1.0:10.0. The amount of the dialkylaluminum halide used is at least $1.0 \times 10^{-4}$ gm./gm. of monomer and can be as much as $25 \times 10^{-4}$ gm./gm. of monomer. The amount of titanium trichloride employed is generally in the range of $1.5 \times 10^{-4}$ to $10 \times 10^{-4}$ gm./gm. of monomer.

Generally mono-olefins having 2 to 8 carbon atoms therein can be employed as reactants in the process of this invention. However since one of the feed materials is to be employed as a coolant for the reaction in the primary reactor such monomer must be capable of achieving autorefrigeration in the low temperature reactor 16. Suitable olefins include ethylene, propylene, and butene. The other monomer employed will of course be different from that olefin which is employed as the coolant since a copolymer is ultimately desired. However, it is conceivable that homopolymers could if desired be prepared in accordance with the process and apparatus of the instant invention. Likewise while the reaction of mono-olefins is particularly desired it is conceivable that any di-olefin could likewise be employed as the second component in the reaction. A triolefin system such as ethylene-propylene-diolefin could also be used. However the preferred olefins for use in the system are ethylene and propylene.

Although not essential to the conduct of the polymerization, it is often desirable to carry out the polymerization in the presence of elemental hydrogen. When so operating, hydrogen is added in an amount sufficient to provide from 0.02 to 1.0 mol percent hydrogen in the liquid mono-olefin phase in the polymerization zone.

Although pressures ranging from atmospheric up to 5000 p.s.i.g. can be used in the secondary reaction zone, a pressure in the range of 100 to 1000 p.s.i.g. is ordinarily preferred. In general, the pressure used in the process is sufficient to maintain the reaction mixture substantially in the liquid phase.

The proportion of the polypropylene and polyethylene portions of the product can be varied widely. Generally, the predominantly polyethylene portion constitutes 10 to 50, preferably 15 to 25, percent by weight of the final product.

Although the ethylene can be added to the reaction zone in either liquid or gas phase, it is preferable in some instances to add it in liquid phase. The ethylene is generally polymerized substantially to completion in the primary reactor before the reaction mass is passed to the secondary reactor for completion of the reaction.

Infrared spectra of the resin of this invention indicate that the copolymer phase contains methylene sequences of at least 5 or more units. There are two bands present at 13.70 and 13.88 microns, the former being a shoulder on the latter. The 13.70 micron band disappears when the sample is melted, indicating that a crystalline polyethylene structure is present.

The following example will further illustrate my invention. However, the example is illustrative and should not be considered unduly limiting.

Example 7990 pounds of liquid propylene at 105° F. is flashed to approximately 30 p.s.i.a. pressure to cool it to approximately −28° F. 2540 pounds of propylene vapor is removed and 5450 pounds of the cold propylene with 3 pounds of a catalyst comprising diethylaluminum chloride and titanium trichloride is introduced to a primary reactor having a volume of 217 gallons wherein 29 pounds of ethylene and 0.65 pound of hydrogen is added. The heat of reaction raises the resulting reaction mass to a temperature of 60° F. The resulting reaction mass composed of 290 pounds polymer, 5189 pounds propylene and 3 pounds catalyst is then passed to a secondary reactor operating at 60–140° F. and having a volume of about 4720 gallons wherein 0.65 pound of hydrogen is added. The reaction is allowed to go to completion and the reactor effluent containing 1939 pounds polymer, 3540 pounds propylene and 3 pounds catalyst. The ethylene conversion is essentially 100 percent.

The resulting polymer exhibited high flexural modulus and low brittleness temperatures.

Reasonable variations and modifications of this invention can be made, or followed in view of the foregoing, without departing from the spirit or scope thereof.

I claim:

1. A polymerization process for forming solid polymers of a first and second monomer wherein said first monomer is liquid and capable of achieving autorefrigeration and is selected from the group consisting of ethylene, propylene and butene and said second monomer is different from said first monomer and is selected from the group consisting of olefinic compounds having 2 to 8 carbon atoms therein which comprises the steps of:
   (A) autorefrigerating said liquid first monomer;
   (B) thereafter polymerizing a substantial portion of said second monomer under polymerization conditions for a time sufficient to produce a tacky polymer in a primary adiabatic polymerization zone in the presence of said autorefrigerated liquid first monomer using a catalyst comprising (a) an organometal compound of the formula $R_nMX_m$ wherein R is an alkyl, cycloalkyl or aryl radical or combinations of these radicals having up to 20 carbon atoms therein, X is hydrogen or halogen, M is aluminum, gallium, indium or thallium, $n$ is from 1 to 3 inclusive, $m$ is from 0 to 2, inclusive, and the sum of $m$ and $n$ is equal to the valence of the metal M and (b) a halide of a metal of Groups IV–B, V–B, VI–B or VIII;
   (C) thereafter passing the resulting tacky polymer to a secondary polymerization zone wherein the heat of reaction is removed by means of an external coolant maintained under polymerization conditions wherein the remaining portion of said second monomer and said first monomer is allowed to react to completion so as to produce a solid, non-tacky polymer; and
   (D) thereafter recovering the resulting solid polymer as a product of the process.

2. A process according to claim 1 wherein the catalyst comprises diethylaluminum chloride and titanium trichloride.

3. A process according to claim 1 wherein hydrogen is added in an amount sufficient to provide from 0.02 to 1.0 mol percent hydrogen in the liquid mono-1-olefin phase in the polymerization zone.

4. A process according to claim 1 for the formation of a solid copolymer of ethylene and propylene wherein said first monomer is propylene and said second monomer is ethylene.

5. A process according to claim 1 wherein the temperature of said autorefrigerated first monomer is regulated in response to the temperature in said primary adiabatic polymerization zone.

References Cited

UNITED STATES PATENTS

| 2,484,384 | 10/1949 | Levine et al. | |
| 2,889,314 | 6/1959 | Fritz | 260—94.9 |
| 2,964,514 | 12/1960 | Fawcett | 260—94.9 |
| 3,035,040 | 5/1962 | Findlay | 260—94.9 |

FOREIGN PATENTS

| 826,053 | 12/1959 | Great Britain. |
| 898,261 | 6/1962 | Great Britain. |

JOSEPH L. SCHOFER, Primary Examiner.
L. EDELMAN, Assistant Examiner.

U.S. Cl. X.R.

260—80.78, 94.9